United States Patent

Southwell et al.

[11] Patent Number: 6,025,304
[45] Date of Patent: Feb. 15, 2000

[54] PERMEABILITY OR FLUID MOBILITY REDUCTION TREATMENT FOR A HYDROCARBON-BEARING FORMATION USING A DUAL MOLECULAR WEIGHT POLYMER GEL

[75] Inventors: George P. Southwell, Denver; Robert D. Sydansk, Littleton, both of Colo.

[73] Assignee: Marathon Oil Company, Findlay, Ohio

[21] Appl. No.: 09/211,929

[22] Filed: Dec. 15, 1998

[51] Int. Cl.$^7$ .............................. C09K 3/00; E21B 33/13
[52] U.S. Cl. ...................... 507/225; 507/271; 507/903; 507/922; 166/295; 166/308
[58] Field of Search .................... 507/120, 225, 507/271, 903, 922; 166/295, 308

[56] References Cited

U.S. PATENT DOCUMENTS

| | | | |
|---|---|---|---|
| 3,747,681 | 7/1973 | Davis, Jr. et al. | 166/308 |
| 4,210,206 | 7/1980 | Ely et al. | 166/294 |
| 4,579,667 | 4/1986 | Echt et al. | 252/8.55 R |
| 4,604,217 | 8/1986 | Lukach et al. | 252/8.55 |
| 4,683,949 | 8/1987 | Sydansk et al. | 166/270 |
| 4,706,754 | 11/1987 | Smith | 166/295 |
| 4,723,605 | 2/1988 | Sydansk | 166/295 |
| 4,746,687 | 5/1988 | Ryles et al. | 523/130 |
| 4,770,245 | 9/1988 | Sydansk | 166/295 |
| 4,788,228 | 11/1988 | Ryles | 523/130 |
| 4,934,456 | 6/1990 | Moradi-Araghi | 166/270 |
| 4,964,463 | 10/1990 | Shu | 166/270 |
| 4,974,677 | 12/1990 | Shu | 166/270 |
| 5,131,469 | 7/1992 | Lockhart et al. | 166/295 |
| 5,134,176 | 7/1992 | Shu | 523/130 |
| 5,143,958 | 9/1992 | Lockhart et al. | 524/219 |
| 5,219,475 | 6/1993 | Lockhart et al. | 252/8.551 |
| 5,219,476 | 6/1993 | Lockhart et al. | 252/8.551 |
| 5,431,226 | 7/1995 | Sydansk | 166/295 |
| 5,441,928 | 8/1995 | Albonico et al. | 507/225 |
| 5,547,025 | 8/1996 | Ahmed et al. | 507/225 |
| 5,650,633 | 7/1997 | Ahmed et al. | 252/183.11 |
| 5,789,351 | 8/1998 | Ahmed et al. | 507/225 |

FOREIGN PATENT DOCUMENTS

WO 96/17154  6/1996  WIPO .............. E21B 43/25

*Primary Examiner*—Philip Tucker
*Attorney, Agent, or Firm*—Jack E. Ebel

[57] ABSTRACT

A process is provided for reducing the permeability of or fluid mobility within a high-temperature treatment region in or proximate to a hydrocarbon-bearing formation below an earthen surface penetrated by a well bore. The process is initiated by preparing a gelation solution at the earthen surface which includes a base loading of a high molecular weight acrylamide polymer, an additive loading of a low molecular weight acrylamide polymer, a crosslinking agent, and an aqueous solvent. The crosslinking agent is preferably a chromium(III) complex having one or more chromium(III) cations and one or more carboxylate anions. The resulting gelation solution is injected into the well bore and displaced into the treatment region where it is gelled in situ to form a gel which substantially reduces the permeability of or fluid mobility within the treatment region.

24 Claims, 4 Drawing Sheets

PERMEABILITY OR FLUID MOBILITY REDUCTION TREATMENT FOR A HYDROCARBON-BEARING FORMATION USING A DUAL MOLECULAR WEIGHT POLYMER GEL

TECHNICAL FIELD

The invention relates to a process for recovering hydrocarbons from a subterranean formation, and more particularly to treatment of a high permeability region with a permeability or fluid mobility reducing agent, thereby improving hydrocarbon recovery from the formation.

BACKGROUND OF THE INVENTION

The utility of crosslinked polymer gels as a permeability reducing agent in subterranean hydrocarbon-bearing formations to facilitate hydrocarbon recovery therefrom has long been known in the art. U.S. Pat. No. 3,762,476 to Gall is representative of conventional teaching in the art of its time. Gall discloses a conformance improvement treatment process, wherein a permeability reducing crosslinked polymer gel is formed in situ by injecting an aqueous slug containing a crosslinkable water-soluble polymer into a subterranean treatment region followed in sequence by an aqueous slug containing a crosslinking agent containing a polyvalent metal cation. Useful polyvalent metal cations listed in Gall include iron(II), iron(III), aluminum(III), chromium(III), calcium(II), and magnesium(II).

Sequential injection of the gel components as separate and distinct slugs into the treatment region is essential to the teaching of treatment processes such as Gall insofar as surface contacting of the polymer and crosslinking agent was believed to cause premature gelation of the gel components prior to reaching the treatment region. If prematurely formed at the surface or in the well bore, placement in the treatment region of the gels taught by Gall was difficult, if not impossible, to achieve. Consequently, sequential injection of the gel components in concept avoided premature gelation by delaying contacting of the components until they were displaced out into the treatment region. In situ contacting of the polymer and crosslinking agent as required by Gall, nevertheless, proved operationally unattractive in many hydrocarbon recovery applications because of the difficulty in achieving adequate mixing of the gel components in situ. Without adequate mixing, the gels of Gall were poorly formed, resulting in weak and unstable gels which performed ineffectively as permeability reducing agents.

In response to the shortcomings of sequential injection processes such as Gall, U.S. Pat. No. 4,683,949 to Sydansk et al identified specific gel components and gelation parameters for a crosslinked polymer gel having utility in a conformance improvement treatment process, whereby the polymer and crosslinking agent of the gel could be mixed at the surface in a homogeneous gelation solution and placed in the treatment region by injection therein as a single slug. Thus, Sydansk et al overcame the inherent operational limitations of processes such as Gall which required sequential injection and in situ mixing of the gel components. The gel technology of Sydansk et al was predicated on the finding that a chromium(III)/carboxylate complex crosslinking agent could be mixed with a crosslinkable polymer at the surface to form a gelation solution. The gel resulting from this gelation solution was uniquely stable, highly predictable and, therefore, capable of practical long-term stability and good performance in subterranean treatment regions.

The teaching of Sydansk et al has subsequently been modified to adapt the teaching to specific problematic treatment applications. For example, fractured or otherwise highly permeable formations are a difficult environment for conformance improvement treatments because the treatments require gels having a high degree of structure to effectively reduce permeability in the treatment region of such formations. U.S. Pat. No. 5,609,208 to Sydansk discloses the specific utility of gels containing a high molecular weight acrylamide polymer for treatments in high permeability formations because the degree of structure and stability of the gel containing the acrylamide polymer increases as the molecular weight of the polymer is increased. The problem is compounded, however, when the highly permeable formation being treated has a relatively high temperature. The high formation temperature causes polymer autohydrolysis which over time can contribute to destabilization of the gel utilized in the conformance improvement treatment.

Increasing the concentration of the high molecular weight polymer in the gelation solution increases the stability, strength and performance of the resulting gel, which offsets the destabilizing effect of high temperature. However, continuously increasing the concentration of the high molecular weight polymer eventually creates unacceptably high viscosities in the gelation solution which may lead to mixing and dissolution problems and excessive pressure drops in well tubulars and difficulty in preparing the gelation solution, particularly if the polymer is in a dried solid state, and in placing the gelation solution in the treatment region. As such, a need exists for a process which produces a gel having utility in permeability reduction and fluid mobility control treatments, wherein the gel has increased stability, strength and performance, yet the gelation solution from which the gel is produced does not exhibit excessively high viscosities.

Accordingly, it is an object of the present invention to provide a process which forms a crosslinked polymer gel for permeability or fluid mobility reduction in or proximate to a subterranean hydrocarbon-bearing formation, wherein the gel has increased stability, strength and performance. It is also an object of the present invention to provide a gelation solution which forms the crosslinked polymer gel, wherein the gelation solution does not exhibit excessively high viscosities. It is more particularly an object of the present invention to form a gel from a gelation solution which has specific utility for the treatment of high-temperature, highly permeable formations. It is still more particularly an object of the present invention to form a gel from a gelation solution which has specific utility for the treatment of high-temperature, fractured carbonate formations. These objects and others are achieved in accordance with the invention described hereafter.

SUMMARY OF THE INVENTION

The present invention is a process for substantially reducing the permeability of or fluid mobility within a treatment region in or proximate to a hydrocarbon-bearing formation below an earthen surface penetrated by a well bore. The treatment region is preferably contained within a high-temperature fractured carbonate formation. As such, the treatment region preferably has a permeability greater than about 2 darcy and a temperature of at least about 70° C. and more preferably between about 80 and 170° C.

The process is initiated by preparing a gelation solution at the earthen surface. The gelation solution is an admixture comprising at least one of each of the following components: a base loading of a high molecular weight acrylamide polymer, an additive loading of a low molecular weight acrylamide polymer, a crosslinking agent, and an aqueous solvent, and optionally, one or more modifying agents may be added. The high molecular weight acrylamide polymer has an average molecular weight between about 3,500,000 and 30,000,000 and the low molecular weight acrylamide polymer has an average molecular weight between about 10,000 and 3,000,000. The base loading of the high molecular weight acrylamide polymer is from about 3000 to 25,000 ppm and the additive loading of the low molecular weight acrylamide polymer is from about 1000 to 100,000 ppm.

The crosslinking agent is a chromium(III) complex having one or more chromium(III) cations and one or more carboxylate anions selected from the group consisting of mono-carboxylates, poly-carboxylates, substituted derivatives of mono- and poly-carboxylates, and mixtures thereof. The carboxylate anion is preferably selected from the group consisting of acetate, propionate, lactate, glycolate, malonate and mixtures thereof.

The resulting gelation solution is injected into the well bore which is in fluid communication with the subterranean hydrocarbon-bearing formation and the treatment region. The gelation solution is displaced from the well bore into the treatment region and is gelled in situ to form a gel which substantially reduces the permeability of the treatment region to fluid flow therethrough or the fluid mobility within the treatment region.

Another embodiment of the present invention is practiced in a substantially similar manner to the above-recited embodiment. However, in the instant embodiment, the gelation solution is substantially gelled at the surface to form a flowing gel. The resulting flowing gel is injected into the well bore and displaced into the treatment region to substantially reduce the permeability of the treatment region to fluid flow therethrough or to substantially reduce the fluid mobility within the treatment region.

The invention will be further understood from the accompanying drawings and description.

DESCRIPTION OF PREFERRED EMBODIMENTS

Figure 1:
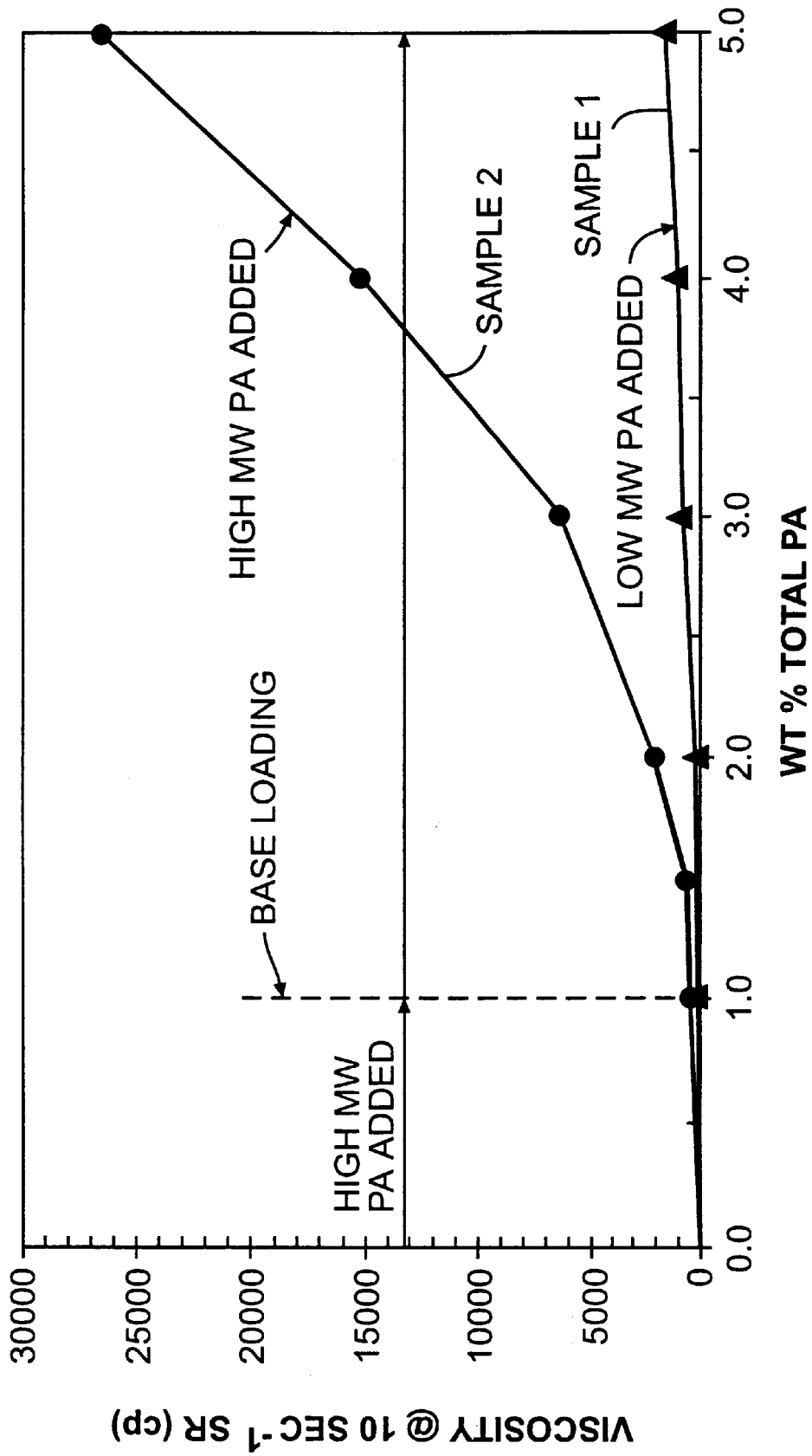
FIG. 1 is graphical display of the test results of Example 5.

The present invention is a treatment process for a region of high permeability proximate to, and in fluid communication with, a region of low permeability. The region of low permeability is contained within a subterranean hydrocarbon-bearing formation and the region of high permeability may also be contained within the formation or may be proximate thereto. The treatment process is specifically designed to reduce the permeability of or fluid mobility within the high permeability region, hereafter termed the treatment region. The term "permeability reduction treatment" as used herein encompasses treatments which diminish the ability of fluids to flow through the treatment region as well as treatments which totally eliminate the ability of fluids to flow through the treatment region. The term "fluid mobility reduction treatment" as used herein encompasses treatments which promote improved sweep efficiency and incremental oil recovery of a gas or liquid drive fluid in a hydrocarbon-bearing formation by placing the fluid mobility reducing agent in the formation in a flowing state in association with a drive fluid. A permeability or fluid mobility reduction treatment can alternatively be termed a fluid flow capacity reduction treatment, and such treatments include conformance improvement treatments, sweep improvement treatments, fluid shutoff treatments, zone abandonment treatments, coning treatments, chemical liner completion treatments, squeeze and recompletion treatments, sweep improvement treatments, and squeeze cement treatments.

The high permeability of a treatment region to which the present process is applicable is generally attributable to the occurrence of one or more anomalies in the geological material of the treatment region or because the treatment region is formed from a highly porous medium. The highly porous medium or anomalies are sufficiently permeable to provide the treatment region with a permeability typically greater than about 2 darcy, whereas the low permeability region has a substantially lower permeability than that of the treatment region, i.e., typically less than about 1 darcy. An "anomaly" is a structural flaw, defined herein as an open volume within the treatment region which has very high permeability relative to the remainder of the formation. The term "anomaly" is inclusive of such highly permeable volumes as fractures, fracture networks, joints, cracks, fissures, voids, vugs, caverns, channels, solution channels, and the like. A "highly porous medium" is defined herein as a material having a very high permeability relative to the remainder of the formation. For example, the highly porous medium can be formed from a substantially continuous consolidated geological material, including sandstone or porous carbonate rock, such as limestone or dolomite. Alternatively, the highly porous medium can be formed from a substantially unconsolidated geological material, including sand or gravel.

The permeability or fluid mobility reduction treatment is effectuated by placing a permeability or fluid mobility reducing agent in the treatment region, wherein the permeability or fluid mobility reducing agent is a crosslinked polymer gel. The treatment process is initiated by admixing at least one of each of the following components to form a homogeneous liquid termed a gelation solution: a crosslinkable high molecular weight polymer, a crosslinkable low molecular weight polymers, a crosslinking agent, and an aqueous solvent; optionally one or more modifying agents may also be added. The gelation solution is defined herein as a gel precursor transformable to a gel after being aged to maturity for a predetermined gel time at a given temperature. A gel is defined as a continuous three-dimensional crosslinked polymeric network integrating a liquid into the interstices of the network.

Crosslinkable high and low molecular weight polymers having utility in the present process are high and low molecular weight, water-soluble, carboxylate-containing, acrylamide polymers. An acrylamide polymer is defined as a polymer having one or more acrylamide groups. Acrylamide polymers include homopolymers, copolymers, terpolymers and tetrapolymers of acrylamide. Acrylamide polymers specifically include polyacrylamide (PA), partially hydrolyzed polyacrylamide (PHPA), copolymers of acrylamide and acrylate (AACP), and the series of polymers developed by Phillips Petroleum Company identified as the "HE SERIES" which consists of homopolymers, copolymers, terpolymers and tetrapolymers of acrylamide.

PA, as defined herein, has from about 0% to 1.5% of its amide groups hydrolyzed. Although PA initially lacks a significant concentration of carboxylate groups, it is capable of autohydrolyzing under certain environmental conditions, thereby satisfying the definition of a carboxylate-containing polymer. PHPA has greater than about 1.5% of its amide groups hydrolyzed and less than 100% of its amide groups hydrolyzed. A preferred PHPA has less than about 50% of its amide groups hydrolyzed. The average molecular weight of the high molecular weight acrylamide polymer having utility herein is generally in a range between about 3,500,000 and 40,000,000, and preferably between about 5,000,000 and 20,000,000. The average molecular weight of the low molecular weight acrylamide polymer having utility herein is generally in a range between about 10,000 and 3,000,000, and preferably between about 150,000 and 600,000.

The high molecular weight acrylamide polymer and low molecular weight acrylamide polymer can be different acrylamide polymer species or can be the same acrylamide polymer species such that the high and low molecular weight polymers differ only by their average molecular weights. It is desirable that a substantial discontinuity exist between the lower molecular weight boundary of the high molecular weight acrylamide polymer and the upper molecular weight boundary of the low molecular weight acrylamide polymer such that when combined, the high and low molecular weight polymers do not exhibit a continuous range of molecular weights. The discontinuity between the upper boundary of the low molecular weight polymer and the lower boundary of the high molecular weight polymer, excluding a minor amount of insignificant outliers, is typically at least about 500,000 daltons of molecular weight, preferably at least about 1,000,000 daltons of molecular weight, and more preferably at least about 1,500,000 daltons of molecular weight.

Polymer crosslinking agents having utility herein may be substantially any composition within the purview of the skilled artisan capable of crosslinking the crosslinkable sites of the high and low molecular weight polymers. The preferred polymer crosslinking agent is a water-soluble complex containing a reactive transition metal cation and an organic carboxylate anion. The preferred transition metal cation is chromium(III). Preferred carboxylate anions include mono-carboxylate anions, such as acetate and propionate, poly-carboxylate anions, such as malonate, and substituted derivatives of carboxylate anions, such as glycolate and lactate. The carboxylate anions are generally obtained from the corresponding acids or salts thereof. An example of a preferred crosslinking agent is one or more chromium(III) cations complexed with one or more acetate anions as taught by U.S. Pat. No. 4,683,949, incorporated herein by reference. The mole ratio of carboxylate anion to transition metal cation in the polymer crosslinking agent is in a range between about 0.5:1.0 and 4.5:1.0, and preferably between about 1.0:1.0 and 3.8:1.0.

The aqueous solvent of the gelation solution is an aqueous liquid capable of forming a solution with the selected polymer and crosslinking agent. The term "solution" as used herein, in addition to true solutions, is intended to broadly encompass dispersions, emulsions, or any other homogeneous mixture of the crosslinkable polymer and polymer crosslinking agent in the aqueous solvent. The aqueous solvent is preferably a fresh water or a brine.

Admixing the high and low molecular weight acrylamide polymers, polymer crosslinking agent, aqueous solvent and optional modifying agent broadly encompasses any number of known techniques, including batch mixing the components in bulk at the surface for subsequent application to the treatment region as needed via a well bore in fluid communication with the treatment region. Admixing alternately encompasses mixing the components on the fly in-line near the well head and substantially simultaneously injecting the gelation solution into the well bore. The polymers, crosslinking agent and optional modifying agent can initially be in a solid or liquid state. If the crosslinking agent is a chromium(III)-acetate complex, preferred forms of the chromium(III)-acetate complex crosslinking agent are solid $CrAc_3$, solid $CrAc_3.H_2O$, solid $Cr_3Ac_7(OH)_2$ or a solution labeled "Chromic Acetate 50% Solution" which is commercially available from McGean-Rohco Chemical Co., Inc., 50 Public Square, No. 1250, Cleveland, Ohio 44113-2251, U.S.A.

The high molecular weight polymer concentration of the gelation solution is generally at least about 3000 ppm, preferably at least about 5000 ppm, and most preferably within a range between about 6000 ppm and 25,000 ppm. The low molecular weight polymer concentration of the gelation solution is generally at least about 1000 ppm, preferably at least about 4000 ppm, and most preferably within a range between about 6000 ppm and 100,000 ppm. The crosslinking agent concentration of the gelation solution is generally between about 100 and 50,000 ppm, and preferably between about 500 and 2000 ppm. As such, the corresponding chromium(III) cation concentration of the gelation solution is generally between about 23 and 11,000 ppm, and preferably between about 110 and 450 ppm. The weight ratio of polymers to crosslinking agent in the gelation solution is preferably between about 40:1 and 2:1.

Modifying agents are materials which modify the properties of the gelation solution, the gelation reaction, or the resulting gel. More particularly, the modifying agents include density control agents, lost circulation agents, gelation rate controlling agents, or stability additives. A density control agent is any material mixed into the gelation solution which substantially modifies the density of the gelation solution, preferably without substantially modifying the subsequent gelation reaction or reducing the strength and integrity of the resulting gel. Density control agents which tend to reduce the density of the gelation solution include inert relatively low density fluids such as liquids, for example fresh water, and inert relatively low density solids such as fibers, for example cellulose fibers. Density control agents which tend to increase the density of the gelation solution include inert relatively high density liquids, such as a saturated aqueous solution of a relatively high density weighting salt, an additive solid salt, and inert relatively high density solids, such as sand or barite.

A lost circulation agent is any solid material mixed into the gelation solution which substantially impedes the flow of the gelation solution through highly porous material of a treatment region, preferably without substantially modifying the subsequent gelation reaction or reducing the strength and integrity of the resulting gel. Lost circulation agents are well known in the art of hydrocarbon production and drilling operations. Exemplary lost circulation agents include cellulose fibers, walnut hulls, chopped up tires, sized salt crystals, calcium carbonate, plastic particles, sand, silica flour, barite, metal filings and the like. It is noted that many of the lost circulation agents recited above, can perform a dual function as both a density control agent and a lost circulation agent.

A gelation rate controlling agent is any material mixed into the gelation solution which substantially retards or accelerates the rate of the subsequent gelation reaction, preferably without substantially modifying the strength and integrity of the resulting gel. In some cases it may be desirable to retard the rate of gelation where the crosslinking agent has an excessively rapid rate of reaction. Gelation rate retarding agents having utility herein include carboxylic acids taught by U.S. Pat. Nos. 4,706,754; 5,131,469; 5,143,958; 5,219,475; and 5,219,476, incorporated herein by reference. Such carboxylic acids include acetic acid, propionic acid, lactic acid, malonic acid and glycolic acid. Other gelation rate retarding agents having utility herein include the carboxylate salts of the above-recited carboxylic acids, including ammonium, potassium, lithium or sodium salts of acetate, propionate, lactate, malonate or glycolate. Additional gelation rate retarding agents having utility herein include the acid and salt forms of succinic, glutaric, and adipic acids. Alternatively, retarded gelation may be achieved without including a gelation rate retarding agent in the gelation solution by appropriate selection of a decarboxylated crosslinking agent in the manner of U.S. Pat. No. 5,431,226, incorporated herein by reference.

In other cases it may be desirable to accelerate the rate of gelation where the crosslinking agent has an unduly slow rate of reaction. Accelerated gelation may be achieved by adding a gelation rate accelerating agent directly to the gelation solution with the other gelation solution constituents or premixing the gelation rate accelerating agent with the crosslinking agent solution. Gelation rate accelerating agents having utility herein include simple mineral acids and inorganic chromic salts taught by U.S. Pat. Nos. 4,723,605 and 4,770,245, respectively, incorporated herein by reference. Such simple mineral acids include hydrochloric acid, nitric acid, sulfuric acid, and the like. Such inorganic chromic salts include chromic trichloride, chromic triiodide, chromic tribromide, chromic triperchlorate, chromic trinitrate, and the like. Alternatively, accelerated gelation may be achieved without including a gelation rate accelerating agent in the gelation solution by appropriate selection of a crosslinking agent having a more rapid rate of reaction, and/or by increasing the concentration of the selected crosslinking agent in the gelation solution, and/or by selecting the high and/or low molecular weight crosslinkable polymer with a higher level of hydrolysis.

A stability additive is any material mixed into the gelation solution which substantially enhances the stability of the resulting gel against adverse effects in the environment of the treatment region. A pH stability additive enhances the stability of the resulting gel against possible in situ acid or alkalinity attack on the gel. A hardness stability additive enhances the stability of the resulting gel against hardness cations present in the aqueous solvent or treatment region, particularly $Ca^{2+}$. A thermal stability additive protects the polymer of the gelation solution against peroxy compounds or peroxy precursor compounds which may be present in the gelation solution or treatment region and which result in free radical attack on the polymer of the resulting gel. Stability additives having utility in the process of the present invention are within the purview of the skilled artisan.

The order of admixing the gelation solution components is not limited to a single embodiment in the practice of the present invention. In accordance with one embodiment, the high molecular weight polymer is added to the aqueous solvent followed by sequential addition of the low molecular weight polymer and the crosslinking agent to the resulting solution. In particular, an amount of the selected high molecular weight polymer is added to the aqueous solvent until a base concentration of the high molecular weight polymer is attained in the resulting solution which causes the viscosity of the solution to approach, but not exceed, a first upper viscosity threshold. The base concentration of the high molecular weight polymer in the aqueous solvent is termed the base loading and is in a range of about 0.3 to 2.5% by weight, and preferably in a range of about 1.0 to 1.5% by weight. Thereafter, an amount of the selected low molecular weight polymer is added to the solution until an additive concentration of the low molecular weight polymer is attained in the solution which causes the viscosity of the solution to approach, but not exceed, a second upper viscosity threshold. The additive concentration of the low molecular weight polymer in the solution is termed the additive loading and is in a range of about 0.1 to 10.0% by weight, and preferably in a range of about 1.0 to 5.5% by weight. The second upper viscosity threshold is a viscosity value, above which it is difficult or impractical to manage the gelation solution and place it in a treatment region in accordance with the present process.

The values of the first and second upper viscosity thresholds are a function of numerous process variables including the specific species and concentrations of the high and low molecular weight polymers, the species and concentrations of the remaining gelation solution components, the character of the treatment region, and the pumping rate and configuration of the pumping system for pumping the gelation solution from the surface into the treatment region.

If the base and additive loadings are predetermined, admixing may be practiced in accordance with an alternate embodiment, wherein the low molecular weight polymer is added to the aqueous solvent followed by sequential addition of the high molecular weight polymer and crosslinking agent to the gelation solution. In particular, the selected low molecular weight polymer is added to the aqueous solvent until the additive loading of the low molecular weight polymer is attained in the resulting solution. Thereafter, the selected upper molecular weight polymer is added to the solution until the base loading of the high molecular weight polymer is attained in the solution. In accordance with another alternate embodiment, the high and low molecular weight polymers may be premixed together and added simultaneously to the aqueous solvent either before or after addition of the crosslinking agent and any optional modifying agent. In accordance with yet another alternate embodiment, the high and low molecular weight polymers are initially separate and dissolved into separate solutions. The solutions are combined and added to the aqueous solvent either before or after addition of the crosslinking agent and any optional modifying agent. In accordance with still another alternate embodiment, the polymers, crosslinking agent, and optional modifying agent are all premixed together in a solid state form to obtain a homogeneous solid premixture. The solid premixture is subsequently added to and dissolved in the aqueous solvent, forming the gelation solution. This embodiment enables all of the gelation solution components with the exception of the aqueous solvent to be premixed in a strictly controlled production facility remote from the oil field and, if desired, bagged in incremental batch quantities for shipment to the oil field. If the solid premixture is bagged, the task of preparing the gelation solution by the operator in the field is greatly simplified since the quantities of the solid components are already measured out. The operator need only mix the bagged batch quantity of gelation solution components with a desired amount of aqueous solvent.

In any case, it is apparent that the viscosity contribution of the low molecular weight polymer to the viscosity of the gelation solution is disproportionately low relative to the weight contribution of the low molecular weight polymer to the total polymer weight and concentration of the gelation solution. Thus, the viscosity of the gelation solution is relatively insensitive to the addition of continuing amounts of the low molecular weight polymer once the base loading of the high molecular weight polymer is attained. In contrast, continued addition of an equivalent amount of the high molecular weight polymer to the gelation solution after the base loading is attained causes the gelation solution to exceed the second viscosity threshold, producing an unacceptably high viscosity.

It is further noted that when gels are prepared from a gelation solution having an acrylamide polymer concentration below the base loading, the strength, stability and performance of the resulting gel increases proportionally as a function of the amount of acrylamide polymer added and as a function of the molecular weight of the acrylamide polymer added up to the base loading. Accordingly, the strength, stability and performance of the gel is more greatly enhanced by the addition of the high molecular weight acrylamide polymer to the gelation solution than the addition of an equivalent amount of the low molecular weight polymer when the gelation solution is in the polymer concentration regime below the base loading. However, when the gelation solution is in the polymer concentration regime above the base loading, the strength, stability and performance of the resulting gel is relatively insensitive to the molecular weight of the added polymer, increasing proportionally with the addition of substantially any acrylamide polymer irrespective of the molecular weight of the acrylamide polymer. As a consequence, it has been found that a gel having superior strength, stability and performance characteristics under harsh high temperature conditions can be prepared from a gelation solution having an acceptably manageable viscosity in accordance with the present teaching.

The present treatment process has utility in substantially any permeability or fluid mobility reduction treatment related to hydrocarbon recovery. However, the treatment process is particularly applicable to conformance improvement treatments and fluid shut-off treatments. Conformance improvement treatments improve vertical and areal conformance within a subterranean formation and correspondingly improve flow profiles and sweep efficiencies of injected fluids or produced hydrocarbon fluids in the formation, thereby enhancing contact within the formation between injected or natural drive fluids and produced hydrocarbon fluids to desirably mobilize the hydrocarbon fluids and facilitate their displacement from the formation. Conformance improvement treatments can also prevent the diversion of injected fluids away from a hydrocarbon-producing zone into adjacent thief zones of the formation. Fluid shut-off treatments and, specifically, water or gas shut-off treatments are generally performed at or near a production well bore to block the flow of water or gas into the well bore.

The present treatment process is most particularly applicable to conformance improvement treatments and fluid shut-off treatments in high-temperature carbonate formations which exhibit fractures or other highly permeable anomalies. A high-temperature environment is particularly problematic because high temperatures favor the autohydrolysis reaction of the acrylamide polymer. High-temperature formations are typically those formations having a temperature above at least about 70° C. and preferably between about 80 and 170° C. The gel resulting from the present treatment process is characterizable as a stable gel which does not exhibit substantial loss of structure over time as evidenced by reduction in gel strength or expulsion of water, termed network breakdown or syneresis, even when exposed to high temperatures.

Conformance improvement treatments, and particularly sweep improvement treatments and water shutoff treatments, are generally high volume gel treatments when applied to fractured formations or far well bore regions of a formation. A far well bore region of a formation is a region extending radially at least 2 meters or more from the well bore, and preferably extending radially at least 3 meters or more from the well bore. In the practice of a conformance improvement treatment, which includes sweep improvement treatments for injection well bores and water shutoff treatments for production well bores, the gelation solution is injected into a well bore penetrating the subterranean hydrocarbon-bearing formation and in fluid communication with the desired treatment region. The gelation solution is displaced from the well bore into the treatment region. The crosslinking agent of the gelation solution effectuates crosslinking between appropriate sites of the same or different polymer molecules to create the network structure of the gel. The terms "crosslinking", "gelling" and "gelation" are used synonymously herein. Partial crosslinking of the polymer by the crosslinking agent may occur in the gelation solution before the solution reaches the treatment region, but complete crosslinking resulting in gel formation often does not occur until at least a substantial portion of the gelation solution is in place in the treatment region.

Complete crosslinking is achieved when either substantially all of the reactable crosslinking agent or substantially all of the polymer crosslinking sites are consumed in the crosslinking reaction as the gelation solution is aged. Prior to complete crosslinking, the gelation solution is deemed flowing to the extent it is readily displacable from the well bore and through the formation. After complete crosslinking, the gelation solution is fully transformed to a gel which is at least more resistant to flow than the gelation solution and in many cases is non-flowing to the extent it has sufficient strength to resist propagation from the treatment region during subsequent normal well bore operations of hydrocarbon production or hydrocarbon recovery fluid injection.

Upon complete crosslinking, or complete gelation or gel maturation, as it is alternatively termed, a sufficient volume of the newly-formed gel resides in place within the treatment region to reduce the permeability of or fluid mobility within the treatment region. Consequently, the gel enables the natural oil recovery drive fluids or the fluids subsequently injected into the formation to more uniformly sweep the untreated hydrocarbon producing zone in preference to the treatment region. Alternatively, the gel retards or eliminates unwanted water or gas production. It is noted that the gel prepared in accordance with the present invention retains its stability when contacted by liquid hydrocarbons within the formation and has a relatively high structural strength. The gel is also stable to contact with high salinity and hardness formation waters. Furthermore, flowing gels prepared hereby typically exhibit relatively low mobilities for flow, while non-flowing gels prepared hereby typically exhibit a yield pressure greater than injection or production pressures which are commonly encountered during oil production, thereby enabling the gel to remain in place throughout the production life of the subterranean hydrocarbon-bearing formation. The "yield pressure" is defined herein as the maximum pressure which can be applied in a given geometry at a given temperature to the gel before the gel experiences structural failure or substantial structural deformation and begins to flow.

The process of the present invention has been described above in each of its embodiments, wherein the treatment composition is applied to the treatment region in the form of a gelation solution which is substantially gelled in the treatment region. It is further within the scope of the present invention to practice each of the above-described embodiments, wherein the treatment composition is applied to the treatment region in the form of a gel. In accordance with these embodiments, the gelation solution is substantially gelled before reaching the treatment region. However the resulting gel is a flowing gel, being sufficiently fluid to enable application of the gel to the treatment region, but having sufficient structure to effectively reduce the permeability of or the fluid mobility within the treatment region upon application thereto.

The following examples demonstrate the practice and utility of the present invention, but are not to be construed as limiting the scope thereof.

EXAMPLES

Examples 1–4 set forth below describe a series of tests conducted at high temperature to determine the semi-quantitative gelation rates, semi-quantitative gel strengths, and long-term stability of polymer gel samples prepared in accordance with the present invention. Each gel sample of Examples 1–4 is formulated as follows. A gelation solution is individually prepared by dissolving a polyacrylamide polymer in synthetic seawater. One or more stability additives or modifying agents are optionally added as appropriate to the polymer solution. A crosslinking agent, in the form of a 50 wt % active $CrAc_3$ solution, is then mixed into the solution producing the desired gelation solution. (All concentrations recited herein are expressed as wt % active chemical unless stated otherwise.)

A volume of the resulting gelation solution is placed in a thick-walled glass ampule. The ampule has an inside diameter of 2.4 cm and an internal height of about 12 cm. Free oxygen is removed from the ampule interior and sample and the ampule is sealed at the ampule cap. The sealed ampule is placed in an air bath at the aging temperature and the sample is aged over time. While the sample is aging, the ampule is periodically inverted and the strength of the resulting gel is observed and recorded as a function of time in accordance with the following Gel Strength Code (GSC) Table.

GEL STRENGTH CODE TABLE

CODE

A    No detectable gel formed. The gel appears to have same viscosity (fluidity) as the original polymer solution and no gel can be visually detected.
B    Highly flowing gel. The gel appears to be only slightly more viscous than the initial relatively low viscosity polymer solution.
C    Flowing gel. Most of the obviously detectable gel flows to the ampule cap upon inversion.
D    Moderately flowing gel. A small portion (about 5 to 15%) of the gel does not readily flow to the ampule cap upon inversion - usually characterized as a "tonguing" gel (i.e., if the gel is hung out of a bottle, the gel can be made to flow back into the bottle by slowly turning the bottle upright).

GEL STRENGTH CODE TABLE

CODE

E    Barely flowing gel. The gel slowly flows to the ampule cap and/or a significant portion (>15%) of the gel does not flow to the ampule cap upon inversion.
F    Highly deformable nonflowing gel. The gel does not flow to the ampule cap upon inversion (gel flows to just short of reaching the ampule cap).
G    Moderately deformable nonflowing gel. The gel flows about halfway down to the ampule cap upon inversion.
H    Slightly deformable nonflowing gel. The gel surface only slightly deforms upon inversion.
     Rigid gel. There is no gel-surface deformation upon inversion.

"+" or "−" depicts shades of the gel strength code characterization.

Example 1

Two samples are prepared in the above-described manner and placed in individual ampules. The gelation solution of gel sample 1 contains 1.2 wt % high molecular weight (MW) polyacrylamide polymer (PA) and 3.0 wt % low MW PA such that the total polymer concentration of the gelation solution is 4.2 wt % active polymer. The gelation solution of gel sample 2 contains only 1.2 wt % high MW PA and no low MW PA. The high MW PA is 0.6 mole % hydrolyzed and has a molecular weight in a range between 4,000,000 and 6,000,000. The low MW PA is 1.5 mole % hydrolyzed and has a molecular weight of about 500,000. The samples are aged at an aging temperature of 104° C. and the test results are set forth in Table 1 below.

TABLE 1

| Sample Number | 1 | 2 |
| --- | --- | --- |
| PA:$CrAc_3$ wt ratio | 10.0:1 | 15.0:1* |
| $CrAc_3$ conc. (ppm) | 4200 | 800 |
| Cr(III) conc. (ppm) | 953 | 182 |
| Aging Time (hrs) | GSC | GSC |
| 0 | A | A |
| 0.5 | C | A |
| 1.0 | D | C |
| 2.0 | I | G |
| 3.0 | I | H |
| 4.0 | I | H |
| 6.0 | I | H |
| 24 | I | G |
| 48 | I | G |
| 120 | I | G & C** |
| 300 | I | A & F |
| 600 | I | A |
| 1200 | I | A |
| 2400 | I | A |
| 6500 | I | A |
| 21600 (900 days) | I | A |

*PA:$CrAc_3$ wt ratio optimized for gel sample 2.
**sample 2 exists simultaneously as two distinct gels (in this case G and C), wherein the first reported gel (in this case G) is the majority of the sample.

Table 1 demonstrates the stability of a dual molecular weight polymer gel prepared in accordance with the present invention. Gel samples 1 and 2 are intended for a water shutoff treatment. Due to viscosity constraints, the concentration of high MW PA in the gelation solution pumped into the treatment region cannot exceed about 1.2 wt %. Therefore, additional low MW PA is added to gel sample 1 along with an appropriate amount of additional crosslinking agent. The additional low MW PA does not appreciably increase the viscosity of the gelation solution of gel sample 1 compared to gel sample 2. However, gel sample 1 exhibits a high degree of long-term thermal stability, retaining acceptable gel strength after 900 days aging at 104° C. By contrast, gel sample 2 exhibits poor and unacceptable long-term stability. The gel chemically degrades completely back to a watery solution within 600 hours of aging at 104° C.

Example 2

Three samples are prepared in the above-described manner and placed in individual ampules. The gelation solution of gel sample 1 contains 1.2 wt % high MW PA and 3.0 wt % low MW PA and the total polymer concentration is 4.2 wt % active polymer. The gelation solution of gel sample 2 contains 1.2 wt % high MW PA and 2.0 wt % low MW PA such that the total polymer concentration of the gelation solution is 3.2 wt % active polymer. The gelation solution of gel sample 3 contains only 1.2 wt % high MW PA and no low MW PA. The high MW PA is 0.6 mole % hydrolyzed and has a molecular weight in a range between 4,000,000 and 6,000,000. The low MW PA is 1.5 mole % hydrolyzed and has a molecular weight of about 500,000. The samples are aged at an aging temperature of 124° C. and the test results are set forth in Table 2 below.

TABLE 2

| Sample Number | 1 | 2 | 3 |
|---|---|---|---|
| PA:CrAc$_3$ wt ratio | 10.0:1 | 8.0:1 | 13.0:1* |
| CrAc$_3$ conc. (ppm) | 4200 | 5330 | 923 |
| Cr(III) conc. (ppm) | 832 | 1210 | 210 |
| Aging Time (hrs) | GSC | GSC | GSC |
| 0 | A | A | A |
| 0.5 | D | D | C |
| 1.0 | I | H | H |
| 2.0 | I | I | G |
| 4.0 | I | I | G |
| 6.0 | I | I | G |
| 24 | I | I | G |
| 48 | I | 1 | F & A |
| 72 | I | I | F & A |
| 96 | I | I | A & F |
| 168 | I | I | B |
| 300 | I | I | A |
| 600 | I | I | A |
| 1200 | I | I | A |
| 4000 | I | I | A |
| 7200 (300 days) | I | I | A |

*PA:CrAc$_3$ wt ratio optimized for gel sample 2

Table 2 demonstrates the stability of a dual molecular weight polymer gel prepared in accordance with the present invention. Gel samples 1–3 are intended for a water shutoff treatment. Due to viscosity constraints, the concentration of high MW PA in the gelation solution pumped into the treatment region cannot exceed about 1.2 wt %. Therefore, additional low MW PA is added to gel samples 1 and 2 along with an appropriate amount of additional crosslinking agent. The additional low MW PA does not appreciably increase the viscosity of the gelation solution of gel samples 1 and 2 compared to gel sample 3. However, gel samples 1 and 2 exhibit a high degree of long-term thermal stability, retaining acceptable gel strength after 300 days aging at 124° C. By contrast, gel sample 3 exhibits poor and unacceptable long-term stability. The gel chemically degrades back to a watery solution within 300 hours of aging at 124° C.

Example 3

Two 15.0 gm samples are prepared in the above-described manner and placed in individual ampules with 5.0 gm of 10–30 mesh limestone chips. The presence of limestone carbonate chips in the ampule permits the study of gel interaction with carbonate minerals, simulating a carbonate-containing treatment region. Specifically, the limestone carbonate chips permit the demonstration of the long-term stability and functionality of the gels under alkaline conditions which result when carbonate minerals partially dissolve in the formation water of a carbonate hydrocarbon-bearing formation at high temperature.

The gelation solution of gel sample 1 contains 1.5 wt % high MW PA and 3.5 wt % low MW PA such that the total polymer concentration of the gelation solution is 5.0 wt % active polymer. The gelation solution of gel sample 2 contains only 1.5 wt % high MW PA and no low MW PA. The high MW PA is less than 0.1 mole % hydrolyzed and has a molecular weight in a range between 4,000,000 and 6,000,000. The low MW PA is less than 0.1 mole % hydrolyzed and has a molecular weight of about 500,000. HAc and NaF are also added to both samples as a pH stability additive and a hardness stability additive, respectively. The samples are aged at an aging temperature of 116° C. and the test results are set forth in Table 3 below.

TABLE 3

| Sample Number | 1 | 2 |
|---|---|---|
| PA:CrAc$_3$ wt ratio | 18.0:1 | 18.0:1 |
| CrAc$_3$ conc. (ppm) | 2750 | 830 |
| Cr(III) conc. (ppm) | 625 | 180 |
| NaF conc. (ppm) | 1980 | 1990 |
| HAc conc. (ppm) | 992 | 995 |
| Aging Time (hrs) | GSC | GSC |
| 0 | A | A |
| 1.0 | A | A |
| 3.0 | A | A |
| 4.0 | D | D |
| 26 | I | G |
| 48 | I | G |
| 72 | I | F & A |
| 96 | I | A & F |
| 168 | I | A |
| 300 | I | A |
| 600 | I | A |
| 1700 | G | A |
| 2400 | G | A |
| 3600 | G | A |
| 8760 (365 days) | F | A |

Table 3 demonstrates the stability of a dual molecular weight polymer gel prepared in accordance with the present invention. Gel samples 1 and 2 are intended for treatment of a high temperature fractured carbonate formation. Due to viscosity constraints, the concentration of high MW PA in the gelation solution pumped into the treatment region cannot exceed about 1.5 wt %. Therefore, additional low MW PA is added to gel sample 1 along with an appropriate amount of additional crosslinking agent. The additional low MW PA does not appreciably increase the viscosity of the gelation solution of gel sample 1 compared to gel sample 2. However, gel sample 1 exhibits a high degree of long-term thermal stability, retaining acceptable gel strength after 365 days aging at 116° C. in the presence of limestone chips. (A final GSC of F is considered acceptable for the present gel treatment application.) By contrast, gel sample 2 exhibits poor and unacceptable long-term stability. The gel chemically degrades back to a watery solution within 168 hours of aging at 116° C.

Example 4

Three 10.0 gm samples are prepared in the above-described manner and placed in individual ampules with 5.0 gm of 10–30 mesh limestone chips. The gelation solution of gel sample 1 contains 1.5 wt % high MW PA and 2.5 wt % low MW PA such that the total polymer concentration of the gelation solution is 4.0 wt % active polymer. The gelation solution of gel sample 2 contains 1.5 wt % high MW PA and 3.0 wt % low MW PA such that the total polymer concentration of the gelation solution is 4.5 wt % active polymer. The gelation solution of gel sample 3 contains only 1.5 wt % high MW PA and no low MW PA. The high MW PA is less than 0.1 mole % hydrolyzed and has a molecular weight in a range between 4,000,000 and 6,000,000. The low MW PA is less than 0.1 mole % hydrolyzed and has a molecular weight of about 500,000. HAc and NaF are also added to all gel samples as a pH stability additive and a hardness stability additive, respectively. The samples are aged at an aging temperature of 116° C. and the test results are set forth in Table 4 below.

TABLE 4

| Sample Number | 1 | 2 | 3 |
|---|---|---|---|
| PA:CrAc$_3$ wt ratio | 18.0:1 | 18.0:1 | 18.0:1 |
| CrAc$_3$ conc. (ppm) | 2200 | 2480 | 828 |
| Cr(III) conc. (ppm) | 500 | 562 | 188 |
| NaF conc. (ppm) | 1190 | 1190 | 1190 |
| HAc conc. (ppm) | 2970 | 2970 | 2980 |
| Aging Time (hrs) | GSC | GSC | GSC |
| 0 | A | A | A |
| 0.5 | A | A | A |
| 1.0 | E | E | D |
| 2.0 | G | I | E |
| 3.0 | I | I | G |
| 24 | I | I | F |
| 48 | I | I | E & A |
| 72 | I | I | A & F |
| 96 | I | I | A |
| 168 | I | I | A |
| 300 | I | I | A |
| 600 | I | I | A |
| 1200 | I | 1 | A |
| 2400 | H+ | H+ | A |
| 7200 (300 days) | H+ | H+ | A |

Table 4 demonstrates the stability of a dual molecular weight polymer gel prepared in accordance with the present invention. Gel samples 1–3 are intended for treatment of a high temperature fractured carbonate formation. Due to viscosity constraints, the concentration of high MW PA in the gelation solution pumped into the treatment region cannot exceed about 1.5 wt %. Therefore, additional low MW PA is added to gel samples 1 and 2 along with an appropriate amount of additional crosslinking agent. The additional low MW PA does not appreciably increase the viscosity of the gelation solution of gel samples 1 and 2 compared to gel sample 3. However, gel samples 1 and 2 exhibit a high degree of long-term thermal stability, retaining acceptable gel strength after 300 days aging at 116° C. in the presence of limestone chips. By contrast, gel sample 3 exhibits poor and unacceptable long-term stability. The gel chemically degrades back to a watery solution within 96 hours of aging at 116° C.

Examples 5–8 set forth below describe a series of quantitative tests conducted to demonstrate the functional relation between the polymer concentration of the gelation solution, which contains different combinations of molecular weights for a given polymer, and the resulting viscosity of the gelation solution.

Example 5

Two initially identical gelation polymer solution samples are prepared using a fresh water as the aqueous solvent. Each sample initially has a high MW polymer base loading of 1.0 wt % and contains no low MW polymer such that the initial total polymer concentration of the gelation solution is 1.0 wt % active polymer. The initial viscosity of the samples is measured as 160 cp at 10 sec$^{-1}$ shear rate (SR) by means of a Rheometrics RDS II rheometer using a concentric cylinder in the steady shear rate mode at 22±1° C. The initial viscosity is, in this case, near the upper viscosity limit for downhole placement of the gelation solution during a water shutoff treatment.

An incremental amount of the low MW polymer is then added to the first gelation solution sample, while an incremental amount of a high MW polymer is added to the second gelation solution sample. The high MW polymer is a polyacrylamide (PA) having a molecular weight in a range between 4,000,000 and 6,000,000 and the low MW polymer is a polyacrylamide (PA) having a molecular weight of about 500,000. The incremental amounts of the high and low MW PA are selected such that the total polymer concentration of both gelation solution samples increases by an equal amount. The viscosity of the first and second gelation solution samples is measured again and recorded after the incremental addition of polymer to the samples. This procedure is repeated until both gelation solution samples have a final total polymer concentration of 5.0 wt % active polymer.

The test results graphically displayed in FIG. 1 show that repeated incremental addition of the low MW PA to the high MW PA base loading of the first gelation solution sample in accordance with the present invention causes a nearly insignificant increase in the overall viscosity of the first gelation solution sample to 1300 cp. In contrast, repeated incremental addition of the high MW PA to the high MW PA base loading of the second gelation solution sample causes an excessive and unacceptable increase in the overall viscosity of the second gelation solution sample to 26,000 cp even though the total polymer concentration of both gelation solution samples remains substantially equal after each incremental polymer addition.

Example 6

Figure 2:
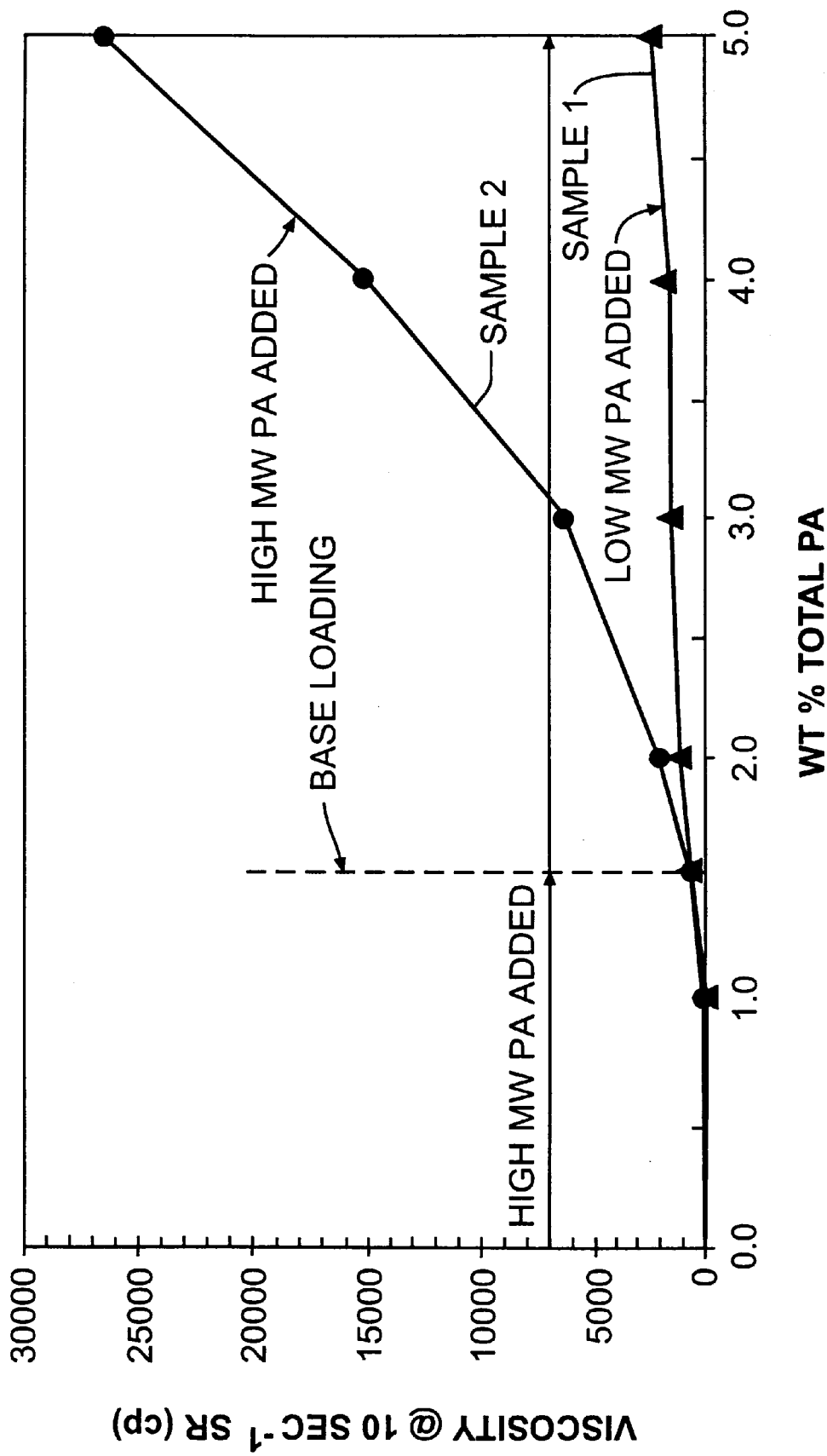
FIG. 2 is graphical display of the test results of Example 6.

Two initially identical gelation solution samples are prepared and tested in substantially the same manner as Example 5, except that each sample initially has a high MW PA base loading of 1.5 wt %. The initial viscosity of the samples is measured as 680 cp (at 10 sec$^{-1}$ SR) which, in this case, is near the upper viscosity limit for downhole placement of the gelation solution during a water shutoff treatment. The test results graphically displayed in FIG. 2 show that repeated incremental addition of the low MW PA to the high MW PA base loading of the first gelation solution sample in accordance with the present invention causes a nearly insignificant increase in the overall viscosity of the first gelation solution sample to 2500 cp. In contrast, repeated incremental addition of the high MW PA to the high MW PA base loading of the second gelation solution sample causes an excessive and unacceptable increase in the overall viscosity of the second gelation solution sample to 26,000 cp.

Example 7

Figure 3:
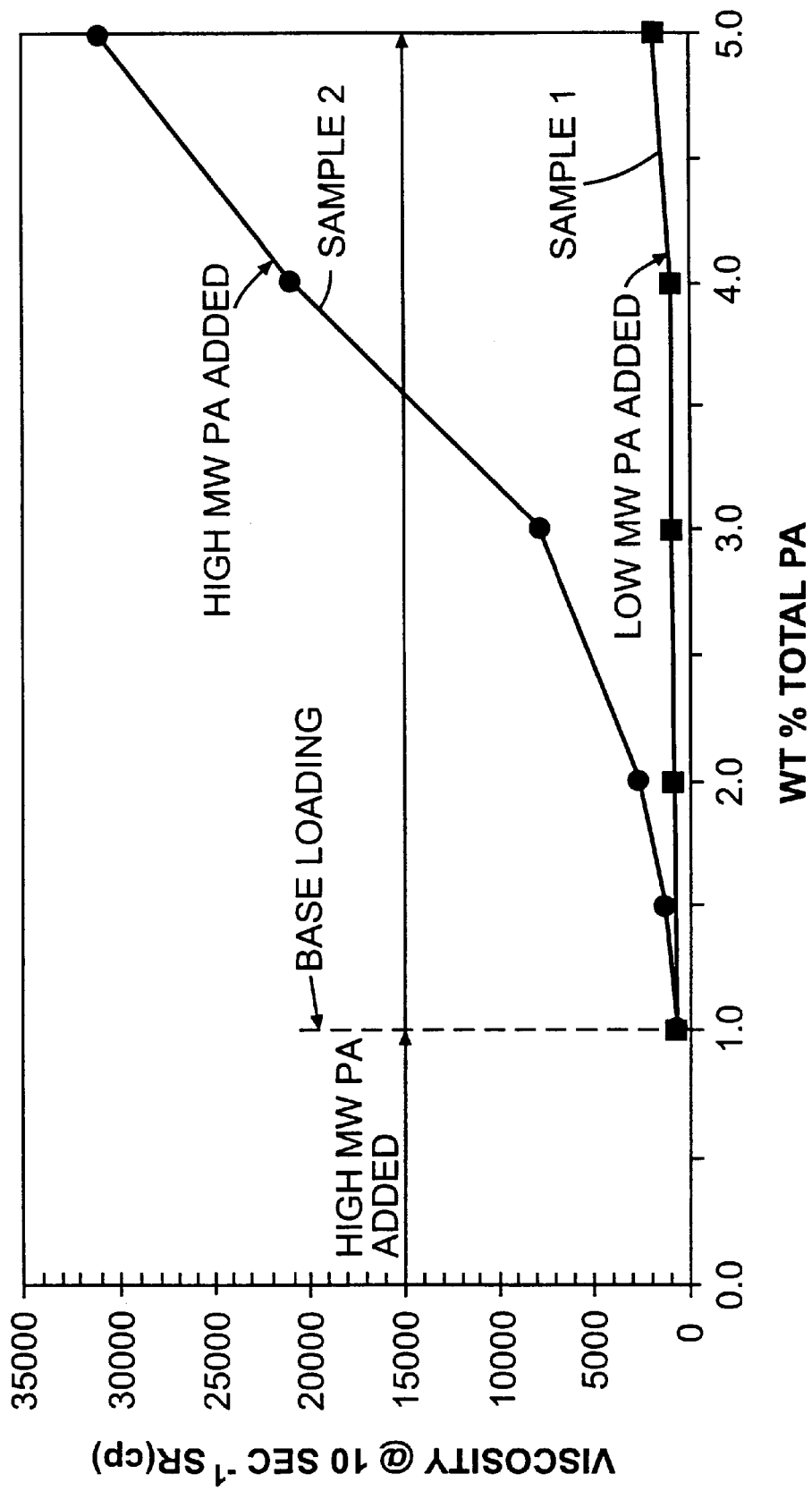
FIG. 3 is graphical display of the test results of Example 7.

Two initially identical gelation solution samples are prepared and tested in substantially the same manner as Example 5, except that the aqueous solvent is a synthetic seawater. The initial viscosity of the samples is measured as 400 cp (at 10 sec$^{-1}$ SR) which, in this case, is near the upper viscosity limit for downhole placement of the gelation solution during a water shutoff treatment. The test results graphically displayed in FIG. 3 show that repeated incremental addition of the low MW PA to the high MW PA base loading of the first gelation solution sample in accordance with the present invention causes a nearly insignificant increase in the overall viscosity of the first gelation solution sample to 1500 cp. In contrast, repeated incremental addition of the high MW PA to the high MW PA base loading of the second gelation solution sample causes an excessive and unacceptable increase in the overall viscosity of the second gelation solution sample to 31,000 cp.

Example 8

Figure 4:
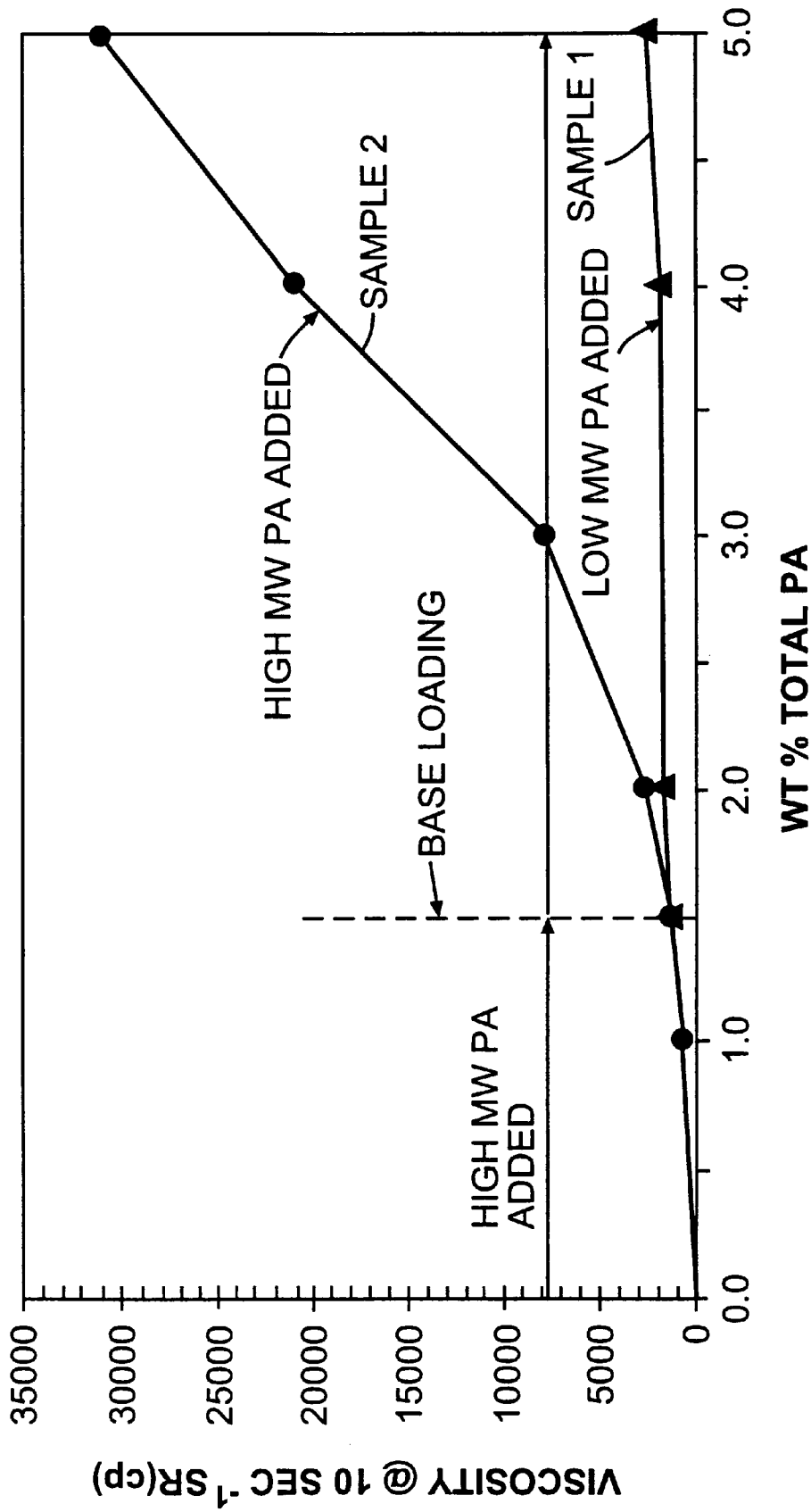
FIG. 4 is graphical display of the test results of Example 8.

Two initially identical gelation solution samples are prepared and tested in substantially the same manner as Example 6, except that the aqueous solvent is a synthetic seawater. The initial viscosity of the samples is measured as 1300 cp (at 10 sec$^{-1}$ SR) which, in this case, is near the upper viscosity limit for downhole placement of the gelation solution during a water shutoff treatment. The test results graphically displayed in FIG. 4 show that repeated incremental addition of the low MW PA to the high MW PA base loading of the first gelation solution sample in accordance with the present invention causes a nearly insignificant increase in the overall viscosity of the first gelation solution sample to 2400 cp. In contrast, repeated incremental addition of the high MW PA to the high MW PA base loading of the second gelation solution sample causes an excessive and unacceptable increase in the overall viscosity of the second gelation solution sample to 31,000 cp.

While the foregoing preferred embodiments of the invention have been described and shown, it is understood that all alternatives and modifications, such as those suggested and others, may be made thereto and fall within the scope of the invention.

We claim:

1. A process for substantially reducing the permeability of or fluid mobility within a treatment region in or proximate to a hydrocarbon-bearing formation below an earthen surface penetrated by a well bore, the process comprising:
 a) preparing a gelation solution at an earthen surface including;
  i) a high molecular weight acrylamide polymer having an average molecular weight between about 3,500,000 and 40,000,000,
  ii) a low molecular weight acrylamide polymer having an average molecular weight between about 10,000 and 3,000,000,
  iii) a crosslinking agent, and
  iv) an aqueous solvent;
 b) injecting said gelation solution into a well bore in fluid communication with a subterranean hydrocarbon-bearing formation and a treatment region;
 c) displacing said gelation solution into said treatment region; and
 d) gelling said gelation solution in said treatment region to form a gel substantially reducing the permeability of or fluid mobility within said treatment region.

2. The process of claim 1 wherein said crosslinking agent is a chromium(III) complex having one or more chromium(III) cations and one or more carboxylate anions selected from the group consisting of mono-carboxylates, poly-carboxylates, substituted derivatives of mono- and poly-carboxylates, and mixtures thereof.

3. The process of claim 2 wherein said carboxylate anion is selected from the group consisting of acetate, propionate, lactate, glycolate, malonate and mixtures thereof.

4. The process of claim 1 wherein said treatment region has a temperature of at least about 70° C.

5. The process of claim 1 wherein said treatment region has a temperature between about 80 and 170° C.

6. The process of claim 1 wherein said treatment region is fractured.

7. The process of claim 1 wherein said treatment region has a permeability greater than about 2 darcy.

8. The process of claim 1 wherein said high molecular weight acrylamide polymer has a concentration in said gelation solution of at least about 0.3 percent by weight.

9. The process of claim 1 wherein said low molecular weight acrylamide polymer has a concentration in said gelation solution of at least about 0.1 percent by weight.

10. The process of claim 1 wherein the ratio of said carboxylate anions to said chromium(III) cations in said chromium(III) complex is between about 1.0:1.0 and 3.8:1.0.

11. The process of claim 1 wherein said gelation solution is prepared by premixing said acrylamide polymers and crosslinking agent together in a solid state to produce a solid premixture and dissolving said solid premixture in said aqueous solvent to form said gelation solution.

12. The process of claim 1 wherein the gelation solution contains a lost circulation agent.

13. A process for substantially reducing the permeability of or fluid mobility within a treatment region in or proximate to a hydrocarbon-bearing formation below an earthen surface penetrated by a well bore, the process comprising:
 a) admixing a base loading of a high molecular weight acrylamide polymer, an additive loading of a low molecular weight acrylamide polymer, a crosslinking agent, and an aqueous solvent at an earthen surface to form a gelation solution, wherein said base loading is from about 0.3 to 2.5 percent by weight and said additive loading is from about 0.1 to 10 percent by weight;
 b) injecting said gelation solution into a well bore in fluid communication with a subterranean hydrocarbon-bearing formation and a treatment region;
 c) displacing said gelation solution into said treatment region; and
 d) gelling said gelation solution in said treatment region to form a gel substantially reducing the permeability of or fluid mobility within said treatment region.

14. The process of claim 13 wherein said crosslinking agent is a chromium(III) complex having one or more chromium(III) cations and one or more carboxylate anions selected from the group consisting of mono-carboxylates, poly-carboxylates, substituted derivatives of mono- and poly-carboxylates, and mixtures thereof.

15. The process of claim 14 wherein said carboxylate anion is selected from the group consisting of acetate, propionate, lactate, glycolate, malonate and mixtures thereof.

16. The process of claim 13 wherein said treatment region has a temperature of at least about 70° C.

17. The process of claim 13 wherein said treatment region has a temperature between about 80 and 170° C.

18. The process of claim 13 wherein said treatment region is fractured.

19. The process of claim 13 wherein said treatment region has a permeability greater than about 2 darcy.

20. The process of claim 13 wherein said high molecular weight acrylamide polymer has an average molecular weight between about 3,500,000 and 40,000,000.

21. The process of claim 13 wherein said low molecular weight acrylamide polymer has an average molecular weight between about 10,000 and 3,000,000.

22. The process of claim 13 wherein the ratio of said carboxylate anions to said chromium(III) cations in said chromium(III) complex is between about 1.0:1.0 and 3.8:1.0.

23. The process of claim 13 wherein said gelation solution is prepared by premixing said acrylamide polymers and crosslinking agent together in a solid state to produce a solid premixture and dissolving said solid premixture in said aqueous solvent to form said gelation solution.

24. The process of claim 13 wherein said gelation solution contains a lost circulation agent.

* * * * *